(12) United States Patent
Igarashi et al.

(10) Patent No.: US 6,319,129 B1
(45) Date of Patent: Nov. 20, 2001

(54) METHOD AND A VIDEO GAME SYSTEM OF GENERATING A FIELD MAP

(75) Inventors: Koji Igarashi; Keisuke Fukuda; Hiroto Yamaguchi; Reika Igarashi, all of Tokyo (JP)

(73) Assignees: Konami Corporation; KCE Tokyo, Inc., both of Tokyo (JP)

(*) Notice: Subject to any disclaimer, the term of this patent is extended or adjusted under 35 U.S.C. 154(b) by 0 days.

(21) Appl. No.: 09/676,486

(22) Filed: Oct. 2, 2000

(30) Foreign Application Priority Data

Sep. 30, 1999 (JP) .................................................. 11-280706

(51) Int. Cl.$^7$ ...................................................... A63F 13/00
(52) U.S. Cl. ........................... 463/31; 345/418; 345/440; 345/441; 345/442; 345/443
(58) Field of Search ..................................... 463/1, 30–31; 345/418, 429–430, 440–443

(56) References Cited

U.S. PATENT DOCUMENTS

| | | | |
|---|---|---|---|
| 4,879,605 | * 11/1989 | Warkentin et al. ................... | 358/296 |
| 5,432,898 | * 7/1995 | Curb et al. ............................ | 395/143 |
| 5,461,703 | * 10/1995 | Goyins et al. ........................ | 395/109 |
| 5,469,513 | * 11/1995 | Kurumida ............................. | 382/203 |
| 5,638,503 | * 6/1997 | Hoel ..................................... | 395/142 |
| 5,818,459 | * 10/1998 | Kurumida ............................. | 345/442 |
| 5,900,884 | * 5/1999 | Minami et al. ....................... | 345/442 |
| 5,966,475 | * 10/1999 | Koon et al. ........................... | 382/301 |
| 6,014,148 | * 1/2000 | Tankelevich ......................... | 345/442 |

* cited by examiner

*Primary Examiner*—Michael O'Neill
*Assistant Examiner*—Scott E. Jones
(74) *Attorney, Agent, or Firm*—Sughrue, Mion, Zinn, Macpeak & Seas, PLLC

(57) ABSTRACT

A method and a video game system that are capable of generating a field map with more natural geographical feature. The method and the video game system firstly divides the field map including a plurality of blocks into a first zone and a second zone by a boundary which consists of sides and corners in the blocks, then determines a first point for each side included in the boundary and a second point for each corner included in the boundary. Finally, the boundary is transformed into a more complex land shape by connecting the first points and the second points. The video game system includes a block division unit that divides the field map into a plurality of blocks, a block assign unit that assigns each of the divided blocks to either a first zone or a second zone using a boundary that consists of sides and corners of the blocks, a first point determining unit that determines a first point for each side, a second point determining unit that determines a second point for each corner, and a transforming unit that transforms the boundary by connecting the first points and the second points.

15 Claims, 13 Drawing Sheets

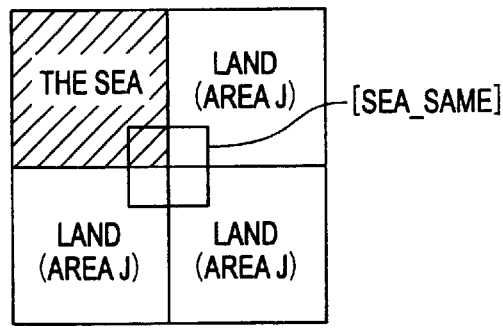
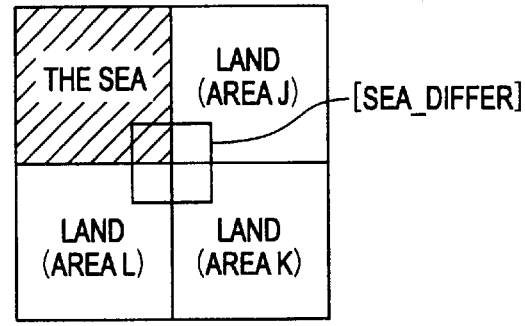
FIG. 8A          FIG. 8B
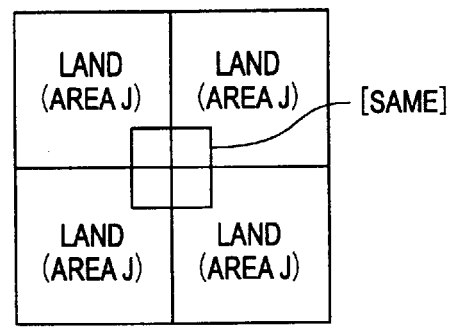
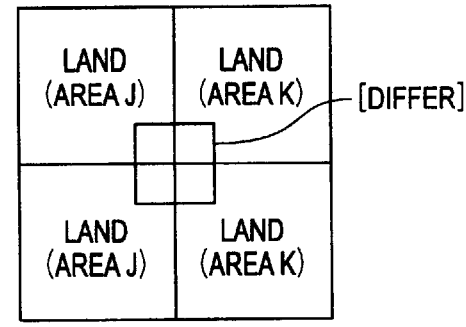
FIG. 8C          FIG. 8D
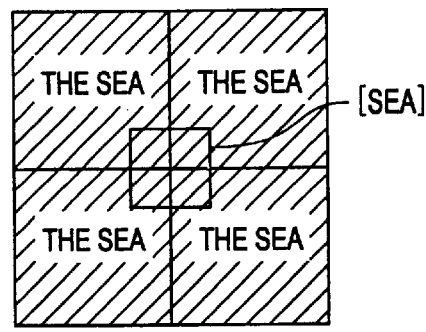
FIG. 8E

METHOD AND A VIDEO GAME SYSTEM OF GENERATING A FIELD MAP

BACKGROUND OF THE INVENTION

1. Field of the Invention

The invention relates to a method of generating a field map automatically in a video game, and in particular, a method of generating more natural geographical features by transforming a selected quadrilateral automatically.

2. Description of the Related Art

In recent years, video game devices have spread to many families quickly. And there are various types of game, such as a role-playing game, a simulation game, a combat game, a puzzle game, and the like.

In a typical role-playing game, dungeon is often used. In the game, treasure or items which are necessary for the game may be hidden in the dungeon, or a strong monster may appear from the dungeon.

Herein, the dungeon generally means "labyrinth" in an actual game. Therefore, the dungeon may be expressed as land, a natural cave, an ice cave, or a lava cave. In such a game, a video game character (for example, main character) moves in the dungeon and therein, encounters various items and monsters, as a story of the game proceeds. Of course, the story varies according to selection of loads or response to encountering of the items or monsters. In this specification, image data representing whole geographical features which are used as the dungeon are referred to as a "field map".

In general, it is necessary to prepare many patterns of shapes of the dungeon (for example, shapes of land) so that a user of the game does not lose interest in the game. To this end, when the game is started or at the other timing, a shape of the dungeon is automatically generated, for example, by using a random number.

However, in the prior game, a shape of the dungeon which is automatically generated becomes unnatural shape since the dungeon is generated by combining a plurality of quadrilaterals. For example, even if the dungeon expresses land or a cave, a boundary of the dungeon, that is, a boundary line between the land and the sea surrounding the dungeon is not generated in a natural and complex shape.

In other words, the boundary line is formed as a shape of steps, that is, a shape with coarse notches in the prior game. Due to the limitation of expression, natural and complex geographical features are not fully represented. Therefore, when a story of the game proceeds on a nature, it is not possible to communicate to a user of the game a feeling of open-air or refreshment, as a result, it is not possible to give the user a feeling of being at a live performance.

SUMMARY OF THE INVENTION

It is therefore an object of the invention to provide a method of representing dungeon in more natural shape. To this end, the method transforms a part of field map representing the dungeon to generate more natural shape of dungeon.

According to a first aspect of the invention, there is provided a method of generating a field map used in a video game. The method comprises steps of dividing the field map which consists of a plurality of blocks, into a first zone and a second zone by a boundary including sides and corners, determining a first point for each side of the boundary on the basis of a location of each side of the boundary, determining a second point for each corner of the boundary on the basis of a location of each corner of the boundary, and transforming the boundary by connecting the first points and the second points.

According to a second aspect of the invention, there is provided a method of generating a field map used in a video game. The method comprises steps of dividing the field map into a plurality of quadrilateral blocks, assigning each of the divided blocks to either a first zone or a second zone, selecting sides each of which forms a part of a boundary between the first zone and the second zone, from sides of the blocks, selecting a point which corresponds to a corner of one of the blocks and which is included in the boundary, determining a first point for each selected side on the basis of a location of each side of the boundary, determining a second point for each selected point on the basis of a location of each corner of the boundary, and transforming the boundary by connecting the first points and the second points.

According to a third aspect of the invention, there is provided a method of generating a field map used in a video game. The method comprises steps of dividing the field map into a plurality of quadrilateral cells, assigning each of the divided cells to either a first zone or a second zone, determining a first cell which belongs to the first zone and is next to a cell which belongs to the second zone, selecting a cell which belongs to the first zone and is next to the first cell, and further repeatedly selecting a cell which belongs to the first zone and is next to the selected cell, and transforming a boundary between the first zone and the second zone by changing cells having a predetermined location relationship to the selected cells to cells which belong to the second zone.

According to a fourth aspect of the invention, there is provided a method of generating a field map used in a video game. The method comprises steps of dividing the field map into a plurality of quadrilateral blocks including a plurality of quadrilateral cells, assigning each of the divided blocks to either a first zone or a second zone, selecting sides each of which forms a part of a boundary between the first zone and the second zone, from sides of the blocks, selecting a point which corresponds to a corner of one of the blocks and which is included in the boundary, determining a first point for each selected side on the basis of a location of each side of the boundary, determining a second point for each selected point on the basis of a location of each corner of the boundary, selecting two first points each of which corresponds to a side, the two corresponding sides are adjacent to each other, selecting one second point which corresponds to a corner formed by the two corresponding side, determining a third point by moving the selected second point on the basis of an aspect of the assigning of the divided blocks to the first zone or the second zone, transforming the boundary by connecting the two selected first points and a point which is optionally selected from the selected second point and the determined third point, selecting a first cell which belongs to the first zone and is next to a cell which belongs to the second zone, selecting a cell which belongs to the first zone and is next to the first cell, further selecting a cell which belongs to the first zone and is next to the selected cell, and repeating the selection of a cell, and transforming the transformed boundary by changing cells having a predetermined location relationship to the selected cells to cells which belong to the second zone.

According to a fifth aspect of the invention, there is provided a video game system which generates a field map. The system comprises block division means which divides the field map into a plurality of quadrilateral blocks, block assign means which assigns each of the divided blocks to either a first zone or a second zone, side select means which selects sides each of which forms a part of a boundary between the first zone and the second zone, from sides of the blocks, corner select means which selects a point which corresponds to a corner of one of the blocks and which is included in the boundary, first point determining means which determines a first point for each selected side on the basis of a location of each side of the boundary, second point determining means which determines a second point for each selected point on the basis of a location of each corner of the boundary, and first transforming means which transforms the boundary by connecting the first points and the second points.

According to a sixth aspect of the invention, there is provided a video game system which generates a field map. The system comprises cell dividing means which divides the field map into a plurality of quadrilateral cells, cell assign means which assigns each of the divided cells to either a first zone or a second zone, first cell selecting means which selects a first cell which belongs to the first zone and is next to a cell which belongs to the second zone, second cell selecting means which selects a cell which belongs to the first zone and is next to the first cell, further selecting a cell which belongs to the first zone and is next to the selected cell, and repeating the selection of a cell, and transforming means which transforms a boundary between the first zone and the second zone by changing cells having a predetermined location relationship to the selected cells to cells which belong to the second zone.

According to a seventh aspect of the invention, there is provided a video game system which generates a field map. The system comprises block division means which divides the field map into a plurality of quadrilateral blocks including a plurality of quadrilateral cells, block assign means which assigns each of the divided blocks to either a first zone or a second zone, side select means which selects sides each of which forms a part of a boundary between the first zone and the second zone, from sides of the blocks, corner select means which selects a point which corresponds to a corner of one of the blocks and which is included in the boundary, first point determining means which determines a first point for each selected side on the basis of a location of each side of the boundary, second point determining means which determines a second point for each selected point on the basis of a location of each corner of the boundary, first point selecting means which selects two first points each of which corresponds to a side, the two corresponding sides are adjacent to each other, second point selecting means which selects one second point which corresponds to a corner formed by the two corresponding side, third point determining means which determines a third point by moving the selected second point on the basis of an aspect of the assigning of the divided blocks to the first zone or the second zone, first transforming means which transforms the boundary by connecting the two selected first points and a point which is optionally selected from the selected second point and the determined third point, first cell selecting means which selects a first cell which belongs to the first zone and is next to a cell which belongs to the second zone, second cell selecting means which selects a cell which belongs to the first zone and is next to the first cell, and repeating the selection of a cell, and second transforming means which transforms the transformed boundary by changing cells having a predetermined location relationship to the selected cells to cells which belong to the second zone.

According to an eighth aspect of the invention, there is provided a recording medium readable by a computer, tangibly embodying a program of generating a field map used in a video game. The program comprises steps of dividing the field map into a plurality of quadrilateral blocks, assigning each of the divided blocks to either a first zone or a second zone, selecting sides each of which forms a part of a boundary between the first zone and the second zone, from sides of the blocks, selecting a point which corresponds to a corner of one of the blocks and which is included in the boundary, determining a first point for each selected side on the basis of a location of each side of the boundary, determining a second point for each selected point on the basis of a location of each corner of the boundary, and transforming the boundary by connecting the first points and the second points.

According to a ninth aspect of the invention, there is provided a recording medium readable by a computer, tangibly embodying a program of generating a field map used in a video game. The program comprises steps of dividing the field map into a plurality of quadrilateral cells, assigning each of the divided cells to either a first zone or a second zone, selecting a first cell which belongs to the first zone and is next to a cell which belongs to the second zone, selecting a cell which belongs to the first zone and is next to the first cell, further selecting a cell which belongs to the first zone and is next to the selected cell, and repeating the selection of a cell, and transforming a boundary between the first zone and the second zone by changing cells having a predetermined location relationship to the selected cells to cells which belong to the second zone.

According to a tenth aspect of the invention, there is provided a recording medium readable by a computer, tangibly embodying a program of generating a field map used in a video game. The program comprises steps of dividing the field map into a plurality of quadrilateral blocks including a plurality of quadrilateral cells, assigning each of the divided blocks to either a first zone or a second zone, selecting sides each of which forms a part of a boundary between the first zone and the second zone, from sides of the blocks, selecting a point which corresponds to a corner of one of the blocks and which is included in the boundary, determining a first point for each selected side on the basis of a location of each side of the boundary, determining a second point for each selected point on the basis of a location of each corner of the boundary, selecting two first points each of which corresponds to a side, the two corresponding sides are adjacent to each other, selecting one second point which corresponds to a corner formed by the two corresponding side, determining a third point by moving the selected second point on the basis of an aspect of the assigning of the divided blocks to the first zone or the second zone, transforming the boundary by connecting the two selected first points and a point which is optionally selected from the selected second point and the determined third point, selecting a first cell which belongs to the first zone and is next to a cell which belongs to the second zone, selecting a cell which belongs to the first zone and is next to the first cell, further selecting a cell which belongs to the first zone and is next to the selected cell, and repeating the selection of a cell, and transforming the transformed boundary by changing cells having a predetermined location relationship to the selected cells to cells which belong to the second zone.

BRIEF DESCRIPTION OF THE DRAWINGS

FIGS. 8A–8E show diagrams representing child blocks each of which stretches over four blocks;

DESCRIPTION OF THE PREFERRED EMBODIMENT

Figure 1:
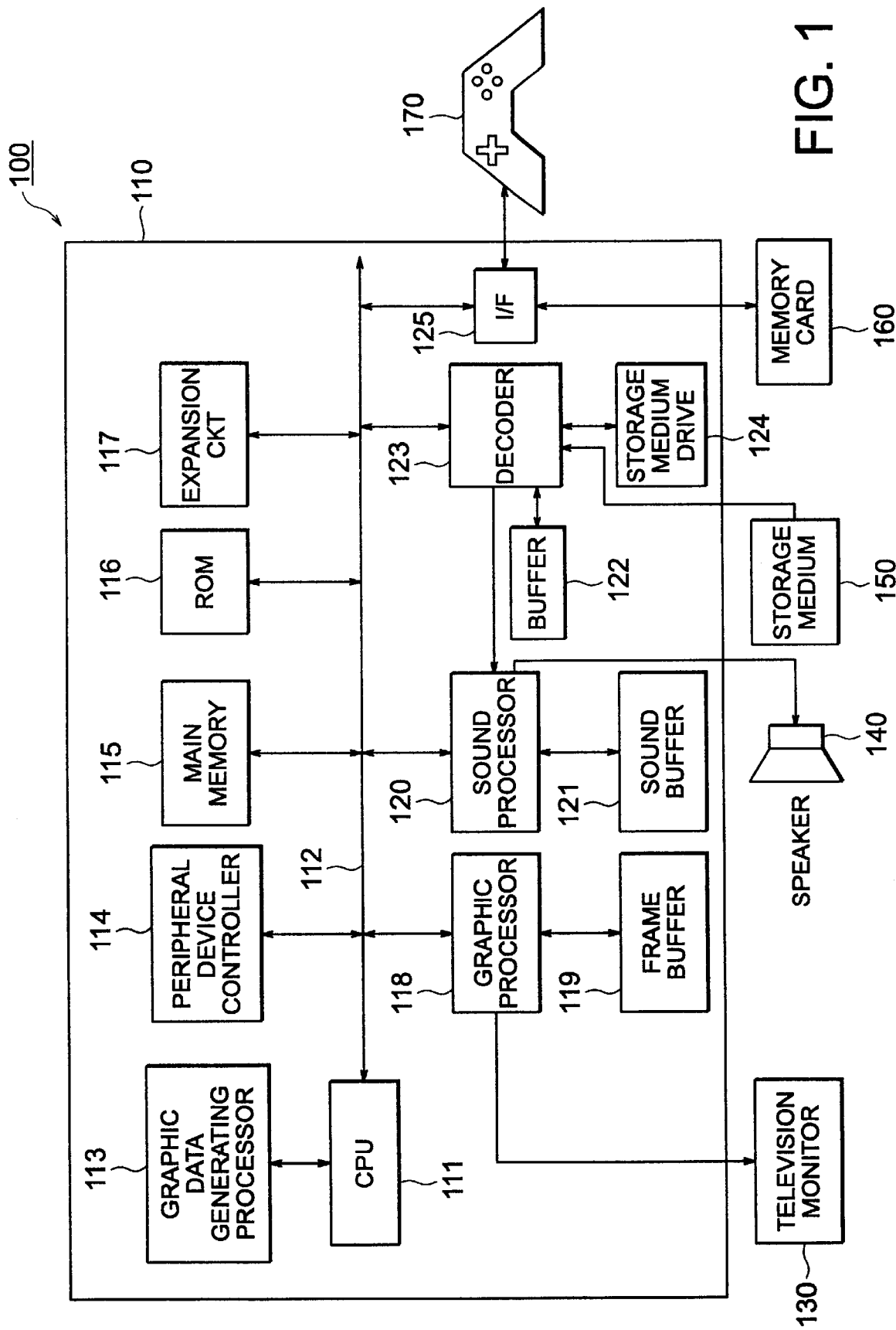
FIG. 1 shows a block diagram of a video game device according to an embodiment of the invention.

Referring to FIG. 1, description is at first made about a video game device of an embodiment of the invention. The video game device shown in FIG. 1 is merely exemplified and may be changed to any other game devices or machines.

The video game device 100 shown in FIG. 1 includes a body 100, a television monitor 130, a speaker 140, a recording medium 150, a memory card 160, and a controller 170. The elements 130 through 170 are connected to the body 100. The game device is suited for home use.

The body 100 further includes a CPU 111, a bus 112 connected to the CPU 111, and some elements connected to the bus 112.

The bus 112 includes an address bus, a data bus, and a control bus. A graphic data generating processor 113, a peripheral device controller 114, a main memory 115, a ROM 116, an expansion circuit 117, a graphic processor 118, a frame buffer 119, a sound processor 120, a sound buffer 121, a decoder 123, a buffer 122, a recording medium drive 124, and an interface circuit 125.

The television monitor 130 (hereinafter, referred to as a "monitor") is connected to the graphic processor 118. Further, the speaker 140 is connected to the sound processor 120, and the memory card 160 and the controller 170 are connected to the interface circuit 125.

As mentioned above, the video game device shown in FIG. 1 is an example suited for home use. In this case, it is general that the monitor of a home television is used as the monitor 130 and a speaker of the home television is used as the speaker 140.

In the case where the method according to the invention is applied to the arcade game device, the above mentioned elements shown in FIG. 1 may be all incorporated into a single body.

Also, when the method of the invention is used in a personal computer of a workstation, a CRT display connected to the personal computer may be used as the monitor 10, and an input device such as a keyboard or a mouse is used as the controller 20.

Then, description is made about the game device in more detail.

The CPU 111 is, for example, a 32-bits RISC (reduced instruction set computer), and controls all elements of the game device by executing an operating system program stored in a ROM 116, which is described later.

The graphic data generating processor 113 serves as a co-processor of the CPU 111. That is, the processor 113 executes calculation for coordinate transformation and a light source, for example, operation of fixed decimal or vector, with parallel processing to display a pseudo three-dimensional image.

The peripheral device controller 114 executes control operation for interruption, time, memory, and direct memory access (DMA) transfer. The ROM 116 stores, as described above, the operating system program which controls operations of the elements in the game device.

The expansion circuit 117 decodes still or animated image data read out from the recording medium 150 and stored in the main memory 115, under the control of the aforementioned CPU 111, and stores the decoded image data back in the main memory 115. Specifically, the expansion circuit 117 is capable of carrying out high-speed execution of inverse discrete cosine transform (inverse DCT) operations, and it is also capable of expanding compressed data read out from the recording medium 150 in accordance with still color image compression standards (known as JPEG) or cumulative media moving image encoding standards (known as MPEG).

Field map is generated according to the method of transforming field map of the invention, and the field map is stored into the frame buffer 119. Consequently, the field map is displayed on the monitor 130. The above process is cooperatively executed by the CPU 111, the graphic data generating processor 113, the graphic processor 118, and the frame buffer 119. Description about the process will be made later in more detail.

The frame buffer 119 includes a display area and a non-display area. The display area is an area for storing images corresponding to a display area on the monitor 130. The non-display area is an area for storing animation images used to produce two-dimensional images in the display area and textures used to produce pseudo three-dimensional images.

In some case, the frame buffer 119 includes a color lookup table (CLUT) which corresponds to a color of pixel to a number. Also, data in the display area in the frame buffer 119 are transferred to the monitor 130 at high-speed. The frame buffer 119 consists of a so-called dual-port RAM, and it is capable of simultaneously receiving images from the graphic data generating processor 113 (CPU 111 ) or transferring data from the main memory 115, and reading out data in order that the data can be displayed to the monitor 130.

The sound processor 120 outputs music or an effective sound via speaker 140 by regenerating ADPCM data in the recording medium 150 or voice data stored in the sound buffer 121, or by modulating and regenerating the voice data.

The decoder 123 decodes a program or data which are stored in the recording medium 150 and are appended an error correction code (ECC), and provides the program or the data to the main memory 115 or the sound processor 120.

The buffer 122 temporarily stores the program and/or data regenerated from the recording medium 150. The buffer 122 has a memory capacity of, for example, 32 kilobytes.

The recording medium drive 124 may be a CD-ROM drive, an optical disk drive, or the like. The recording medium drive 124 reads a program and another data out of the recording medium 150, and provides them to the decoder 123.

The interface circuit 125 sends an operation signal received from the controller 170 to the CPU 111. Also, the interface circuit 125 reads out the contents of the memory card 160 to supply the contents to the main memory 115, and simultaneously stores data into the memory card 160 in response to an instruction of the CPU 111.

A recording medium 150 stores a program and image data required to play a game. The program and the image data are read from the recording medium 150 to a video game device via the recording medium drive 124. The recording medium itself is, for example, a CD-ROM or an optical disk.

The memory card 160 stores values of a various of parameters in order to, for example, maintain the status at the time point when a game terminates last time. The values are transferred to the memory card 160 via the interface circuit 125 as required. To this end, the memory card 160 is connected to a slot of the interface circuit 125.

A handy-type video game device is also connected to a slot of the front side of the interface circuit 125, and a program and data of the video game of the body 100, required to play a game are transferred to the handy-type video game device.

The controller 170 is manipulated to play a game by a user. The controller 170 includes direction buttons for moving a character on the monitor upwards, downwards, leftwards and rightwards, and a plurality of function buttons for instructing one of specific functions, for example, starting the game or selecting items.

The method of transforming field map of the invention may be used in, for example, the following RPG game.

In the RPG game, four partial scenarios are selected from a first partial scenario through a tenth partial scenario, and the selected partial scenarios are combined as a first stage through a fourth stage to generate a story of the game.

According to a condition of ending of the first stage partial scenario, the second stage partial scenario is dynamically selected. Herein, the condition of ending of the first stage partial scenario and a condition of starting of the second stage partial scenario are related so that a transition of two partial scenario is naturally done as a story.

Specifically, the first stage partial scenario is selected from the first partial scenario through the eighth partial scenario, and the condition of ending of the first stage partial scenario is prepared according to a result of processing in the scenario. Therefore, one of the first partial scenario through the tenth partial scenario may be selected as the second stage partial scenario. Thereafter, similar selections are done about the third stage partial scenario and the fourth stage partial scenario.

In the RPG game, scene (area) is changed for each partial scenario, thereby a user of the game newly interests in the game. For example, a first island, a second island, a third island, and a fourth island (a first area through a fourth area) which are defined on a field map corresponds to the first stage partial scenario, the second stage partial scenario, the third stage partial scenario, and the fourth stage partial scenario, respectively, and at the end of the first stage partial scenario, a scene displaying the first island is changed to another scene displaying the second island.

The change of the scene is a part of the game (story), for example, if the condition of ending of the first stage partial scenario is meet, the second island is displayed, and a bridge is created or a ferry is provided so that the main character may move from the first island to the second island.

As described above, the appearance and the change of these scene are important element for the game. Therefore, if the scene (area) includes natural geographical features, such as islands or land, natural expression of the scene (area) is required so that the user may feel open-air or refreshment sense, and atmosphere of being at a live performance.

Next, description is made about transform process of a field map according to the invention with reference to FIGS. 2 through 13.

Figure 2:
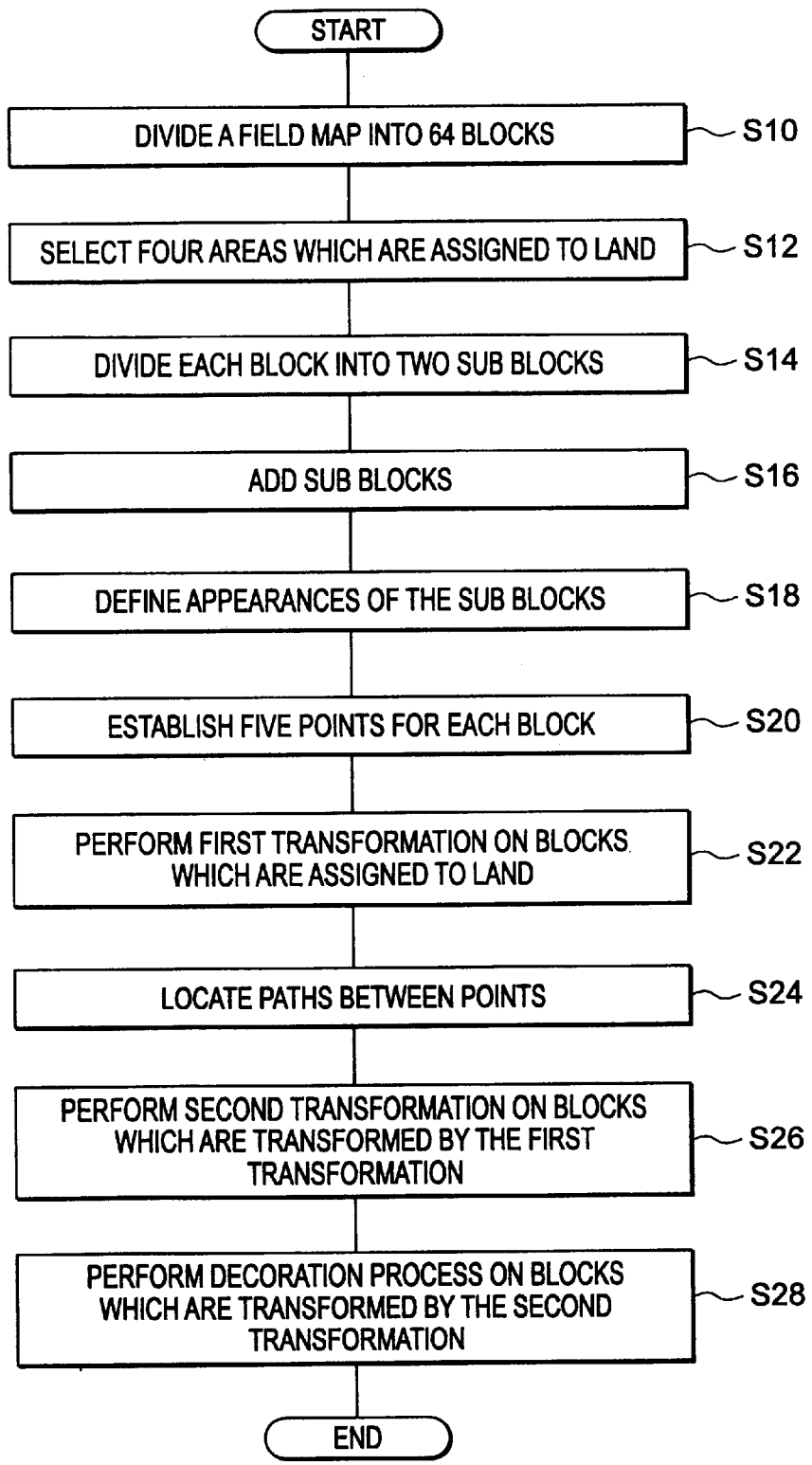
FIG. 2 shows a flowchart representing a method according to an embodiment of the invention.
Figure 3:
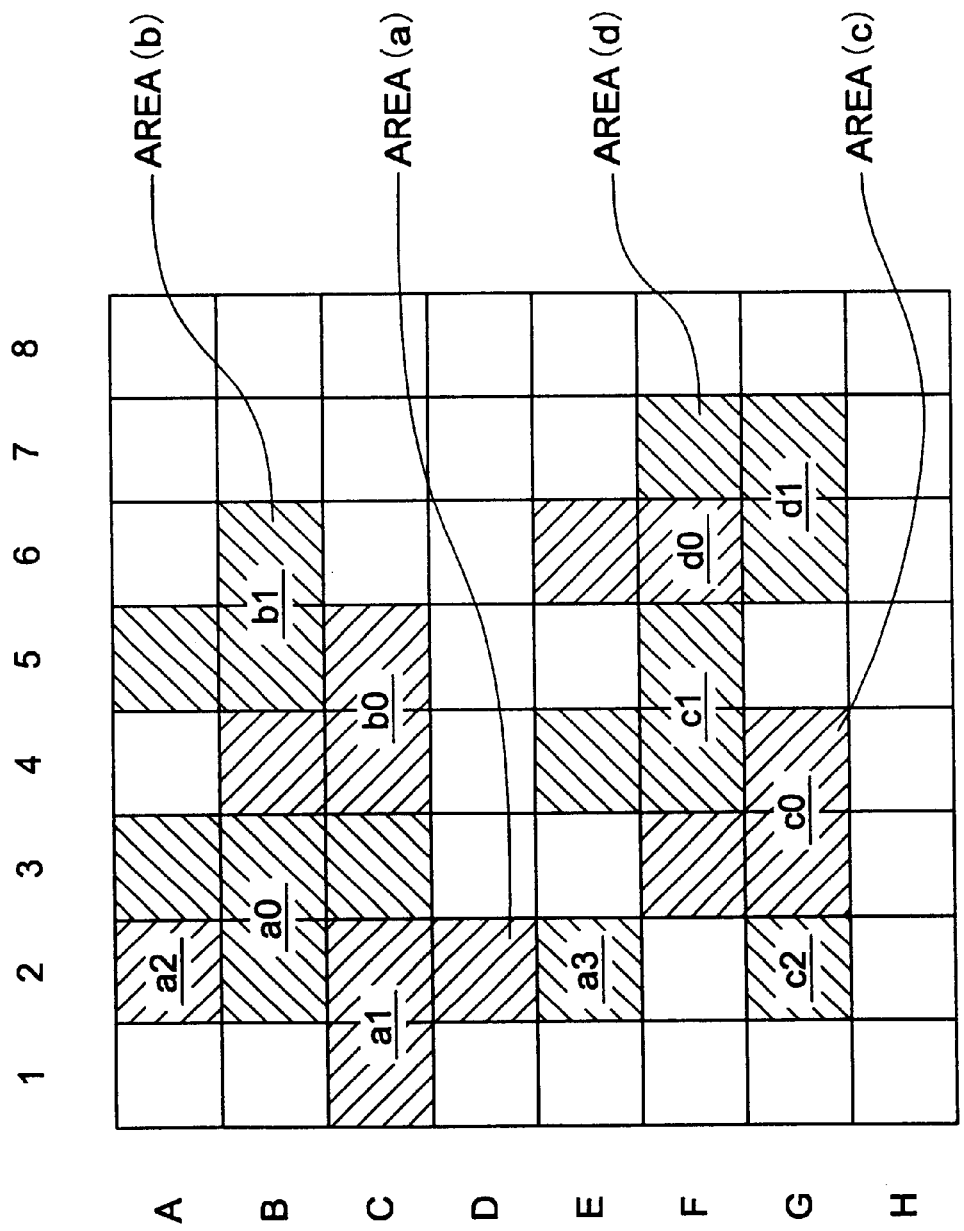
FIG. 3 shows field map, including eight by eight blocks, in which an area is selected.

In FIG. 2, a flowchart of the transform process is shown. At step S10, the field map is divided into 64 (8 by 8) quadrilateral blocks. This divided field map is shown in FIG. 3. Herein, for designating each block later, each column of the divided field map is related to one of numerals 1 to 8, and each row of the divided field map is related to one of characters A to H. Thereby, a block in the field map is specified by using one of the numerals and one of the characters. For example, the block located at the top right of the field map is referred to as block (8A).

At step S12, four areas to which land is assigned are selected. Each area includes at least five blocks, since an area composed of less than five blocks is not enough to express land in the present game. But, an area may include any number of blocks.

In this example, each area corresponds to one of the above mentioned four partial scenarios and the dungeon is formed as land. The concept of the invention may be applied similarly when the other dungeon patterns are used.

The selection of the areas are generally done by using a random number. But, the areas may also decided based on factors such as a value designated by the user or outside information. Hereinafter, when process uses the random number (or process is randomly performed) in the specification, it is implicitly shown that there is a possibility that a result which is different from the previously given result is obtained when the process is repeated such as by restarting the game or moving to the other scenario.

For example, when the game is restarted, other four areas forms different shape of land.

Also, the number of blocks of the whole areas or the number of the area may be limited according to characteristics of game. Herein, the unselected areas represent the sea.

Thereafter, the selected areas are each divided into two sub areas at step S14. Thereby, in addition to boundaries among the four areas, boundaries between the above two sub areas are generated. According to the invention, more natural geographical features may be generated by locating a mountain or a river along the boundaries of the sub areas.

Further, at step S16, some blocks may be selected as additional sub areas from the remaining blocks which are not selected as the four areas and are next to one of the blocks selected as the four area. Herein, three additional sub areas may be added and each sub area includes one block. The additional sub areas are also generated to realize natural geographical features.

Thus selected areas are also shown in FIG. 3. The areas selected at step S12 are an area a (a0 and a1), an area b (b0 and b1), an area c (c0 and c1), and an area d (d0 and d1). Herein, the blocks in each parenthesis are sub areas divided at step S14. The additional areas added at step S16 are a2, a3, and c2. Consequently, the field map of FIG. 3 includes the area a (a0, a1, a2, and a3), the area b (b0 and b1), the area c (c0, c1, and c2), the area d (d0 and d1).

Next, at step S18, definition is made and appearance of land at each sub area is determined. In this example, two sub areas are defined so as to include a snowy field, other two areas are defined so as to include a desert, and the other areas are defined so as to include a grassy plain. These definitions are generally generated by using a random number, but as described above, the other way may be used. Specifically, the sub areas b0 and b1 includes the snowy field and the sub areas c0 and c2 includes the desert.

Then, for each selected block, five points are given at step S20. These points are places where a town, a harbor, a cave, or a tower are located.

Figure 4A:
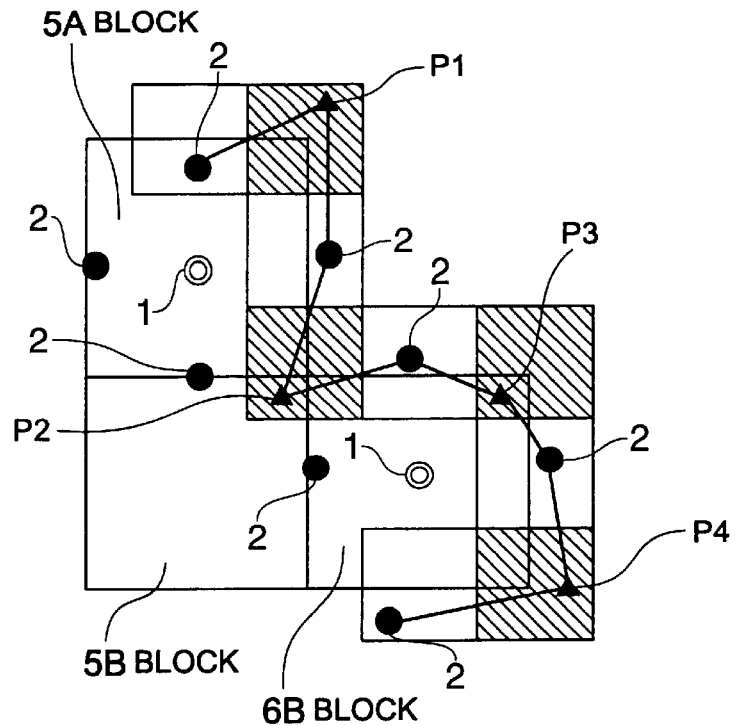
FIGS. 4A and 4B show diagrams schematically representing a first transforming process.
Figure 4B:
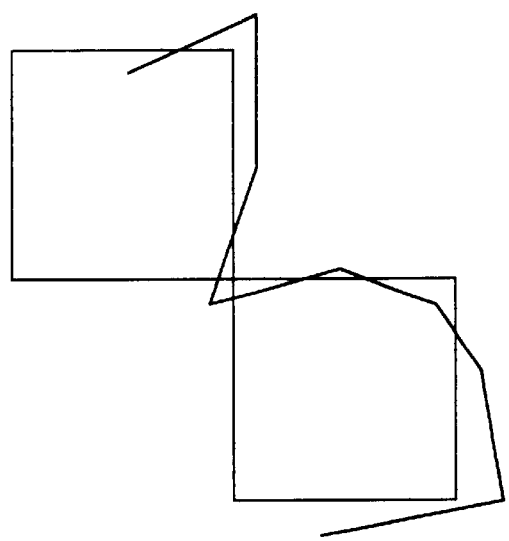
Figure 5:
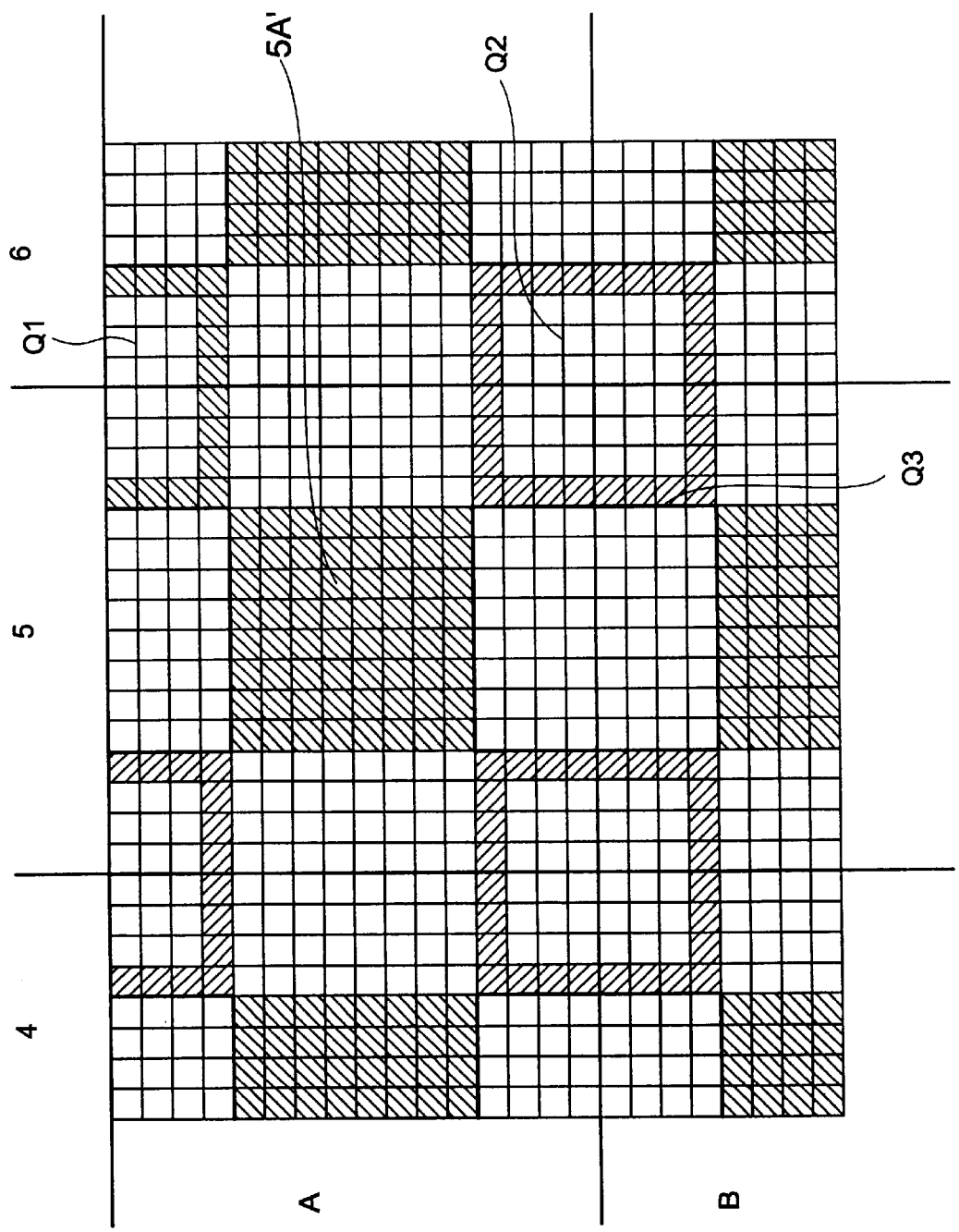
FIG. 5 shows a diagram representing a part of the field map which is divided into 128 by 128 cells.

Description is made about the establishment of the points with reference to FIGS. 4 and 5.

In FIG. 4A, three blocks (5A, 5B, and 6B) are shown. On the other hand, FIG. 5 shows enlarged blocks near the block 5B in the field map of FIG. 3 and the field map is divided into 128 by 128 cells.

In FIG. 3, one quadrilateral corresponds to one block, but in FIG. 5, 16 by 16 cells (quadrilaterals) correspond to one block. Herein, each quadrilateral formed by dividing the field map into 128 by 128 is referred to as "cell". The cell corresponds to pixel of the image on a monitor. Color is defined for each cell, as a whole, an image is displayed on the monitor.

Referring to FIG. 4A again, points "1" are each located at the center of the blocks (denoted by symbols ""◎" ") and points "2" are each located near the midpoint of one of the four sides of the blocks (denoted by symbols ""●" ").

Each point "1" is located at the center of the block, but it is not necessary that the center strictly means the center of gravity. Therefore, the point "1" is located at a location which is determined in a predetermined range near the center by using such as a random number. The predetermined range is, for example, shown as 5A' in FIG. 5 which is 8 by 8 cells located at a central portion of the block and denoted as a shaded portion. Hereinafter, the size of cells is referred to as "sub block".

On the other hand, the point "2" is located for each side of each block, but it is not necessary to locate the midpoint of the side. A location of the point "2" may be determined in a predetermined range near the midpoint by using such as a random number. The range is shown as a sub block Q3 in FIG. 5, which includes boundaries between blocks.

Four points "2" are given for each block, but when there are blocks sharing a side with the other block, the point "2" is also shared. For example, in FIG. 4A, the block 6B and the block 5B share a point "2", and the block 5A and block 5B share a point "2".

Next, at step S22, transformation process is performed using the points "2". Referring to FIG. 4A, at first, middle additional point is given between two points "2" which located at adjacent exterior sides of the blocks forming an area (that is, the seaside). In FIG. 4A, in addition to the points "1" and the points "2", the middle additional points are shown (P1 to P4, denoted by symbol "▲". The middle additional points are located in a predetermined range by using a random number. The predetermined range is, for example for the middle additional point P2, a sub block Q2 shown in FIG. 5 which covers blocks 5A, 6A, 5B, and 6B and is composed of 8 by 8 cells surrounded by shaded frame. Similarly, the middle additional point P1 is located in a sub block Q1. However, the point P1 is not located at a portion above the row A, since the portion is out of the field map. Therefore, a location of the P1 is determined in a portion where the row A and the sub block Q1 overlap each other by using a random number. Similarly, middle additional points P3 and P4 are determined, as a result, outline of land shown in FIG. 4B (denoted by a bold line) is obtained.

By moving each apex of the area in a predetermined range, it is possible to change the prior unnatural boundary line which is formed as a shape of steps to more natural boundary line, to express more complex seaside. Further, the transformed boundary line is transformed so as to express a shape closer to a natural shape. This second transformation is described later in more detail.

Figure 7:
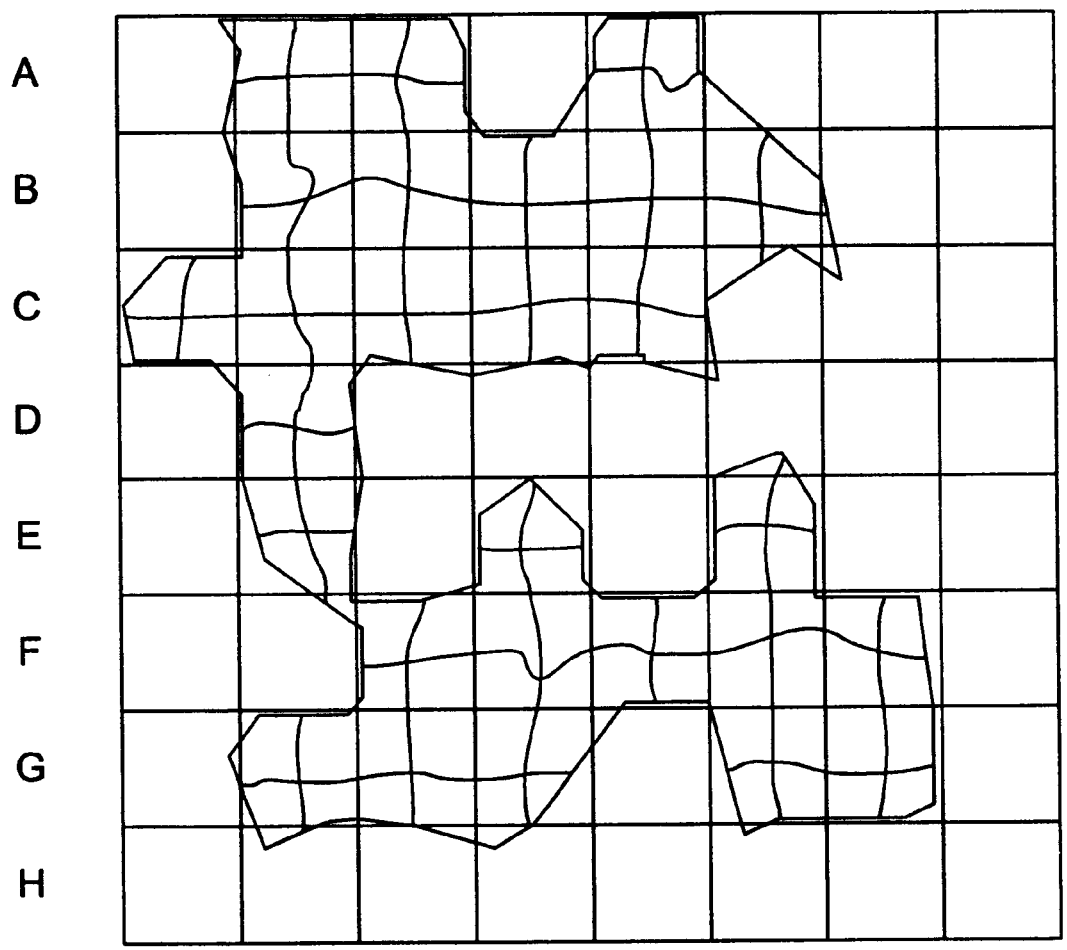
FIG. 7 shows a diagram of field map after a path is added to the field map of FIG. 6.

Referring to flowchart of FIG. 2 again, in step S24, reads are located between the points. The process locate a crossroads by connecting the top point "2" and the bottom point "2" passing through the point "1", and connecting the right point "2" and the left point "2" passing through the point "1". In FIG. 7, the field map including thus located crossroads is shown. It is not necessary that each road is formed as a straight line, and as a shape of the road, any shape including a curve may be selected based on, for example, a random number. Each of the roads is assigned as a path where the character of the game walks through, but the road is not always displayed as a path. The road is sometime displayed, as if the road does not exist, for example, as a grass field or a forest. Also, step S24 may be performed after step S20 or before step S28 described later. For each cell, information whether or not the cell is assigned as the road is retained.

Next, in step S26, the second transformation is performed. The process extends or wears away the field map which is transformed at step S22 (the first transformation).

Description is made about the second transformation with reference to the sub blocks shown in FIG. 5. The sub block includes 8 by 8 cells and may be categorized into the following three categories (1) to (3).

(1) Sub block located at the center of a block (5A' in FIG. 5).

(2) Sub block located to cover four blocks (Q1 and Q2 in FIG. 5).

(3) Sub block located to cover two blocks (Q3 in FIG. 5).

Sub block of categories (2) and (3) is further categorized based on whether the surrounding blocks are land or the sea. The categorization is explained with reference to FIGS. 8A to 8E and 9A to 9D. Herein, quadrilateral which is denoted by bold line and covers two or four blocks is subjective sub block. Name of the sub block is shown in between "[" and "]", for example "[SEA]".

Next, description is made about the further categorization of the category (2). The category (2) is still categorized into categories (2-1) to (2-5). (2-1) At least one of the surrounding blocks is the sea and the rest are land of the same area ([SEA_SAME]). The sub block of the case is shown in FIG. 8A. At most, three sea blocks may exist.

(2-2) At least one of the surrounding blocks is the sea and the rest are land ([SEA_DIFFER]). Further, land of one of the land blocks belongs to different area of land of another land block. The sub block of the case is shown in FIG. 8B. In this case, at most, two sea blocks may exist.

(2-3) All of the surrounding blocks are land of the same area ([SAME]). The sub block of the case is shown in FIG. 8C.

(2-4) All of the surrounding blocks are land and land of one of the blocks belongs to different area of land of another land block ([DIFFER]). The sub block of the case is shown in FIG. 8D.

(2-5) All of the surrounding blocks are the sea ([SEA]). The sub block of the case is shown in FIG. 8E.

Then, description is made about the further categorization of the category (3).

The category (3) is still categorized into categories (3-1) to (3-6).

Figure 9B:
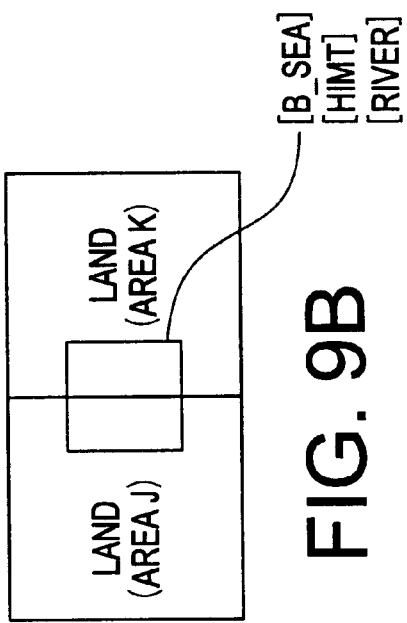
FIGS. 9A–9D show diagrams representing child blocks each of which stretches over two blocks.
Figure 9D:
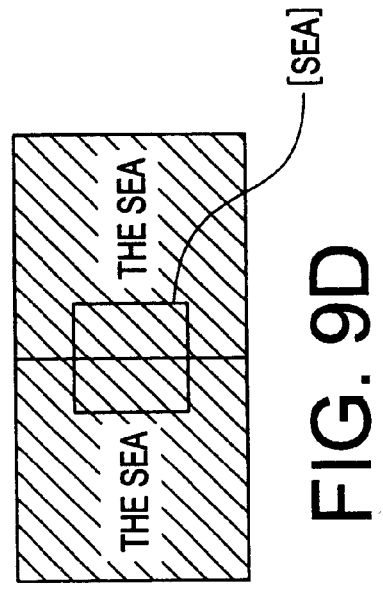
Figure 9A:
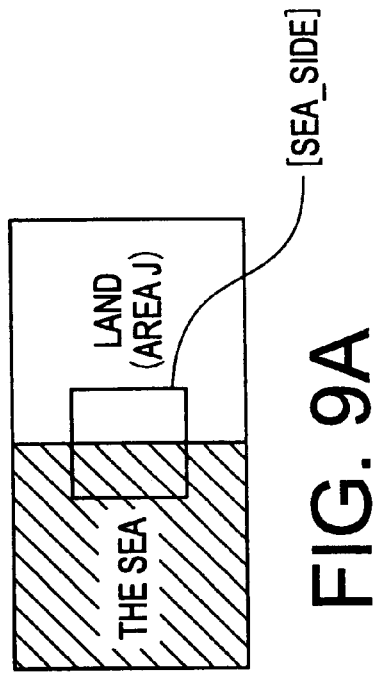

(3-1) Sub block covers a sea block and a land block ([SEA_SIDE]). The sub block in the case is shown in FIG. 9A.

(3-2) A land block is separated from another land block of another area by the sea ([B_SEA]). The sub block in the case is shown in FIG. 9B. As described above, one area is normally separated from the other areas and when user of the game finishes (clears) a partial scenario, the areas are connected (or means of the connection is given). In this case, the sea separates one area from the other are.

(3-3) A land block is separated from another land block of another area by a mountain ([HIMT]). The sub block in the case is also shown in FIG. 9B. The areas are separated because of the same reason as the above category (3-2).

(3-4) A land block is separate from another land block of another area by a river ([B_RIVER]). The sub block in the case is shown in FIG. 9B. The areas are separated because of the same reason as the above category (3-2).

Figure 9C:
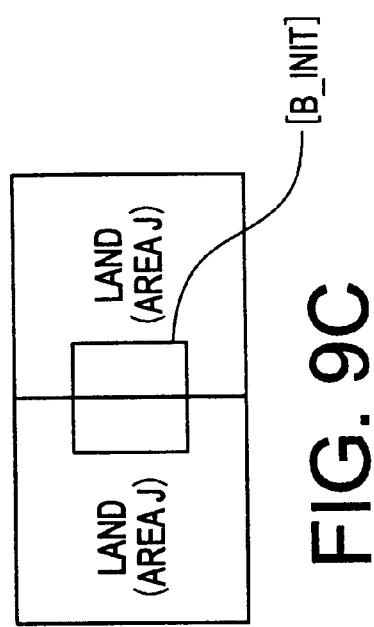

(3-5) Sub block covers land blocks of the same area ([B_INT]). The sub block in the case is shown in FIG. 9C.

Figure 6:
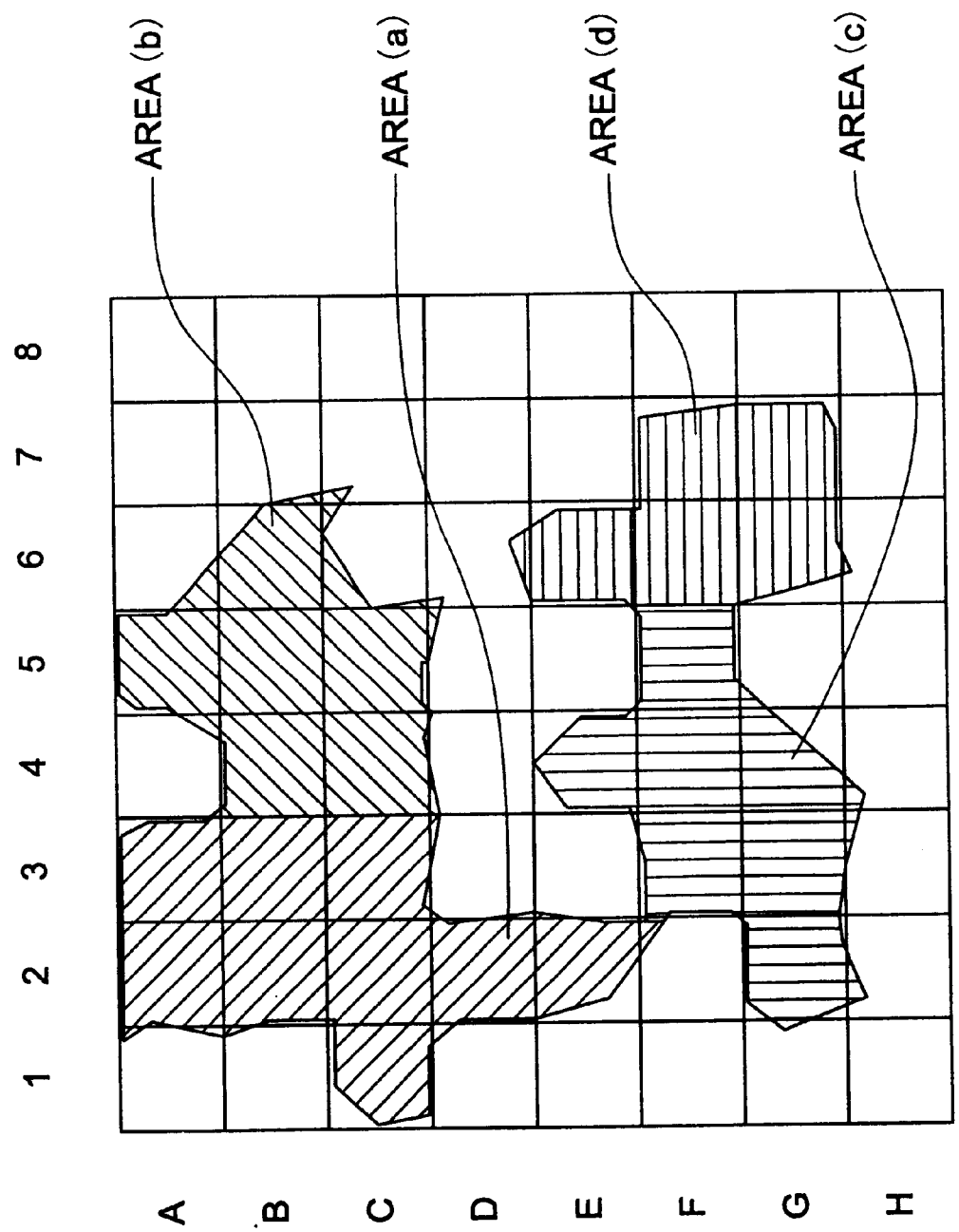
FIG. 6 shows a diagram of field map which is processed by the first transforming process.

(3-6) Sub block covers sea blocks ([SEA]). The sub block in the case is shown in FIG. 9D.

next, description is made about expansion process and wearing process in more detail. By performing the process described above, for example, actual seaside (boundary between the land blocks and the sea blocks) has been created as shown in FIG. 6. Configuration of the actual seaside relates to blocks belong to the above categories [SEA_SAME], [SEA_DIFFER], [SEA_SIDE], and [B_SEA]. Therefore, the expansion process and the wearing process are performed about these categories of blocks.

Expansion Process

Figure 10A:
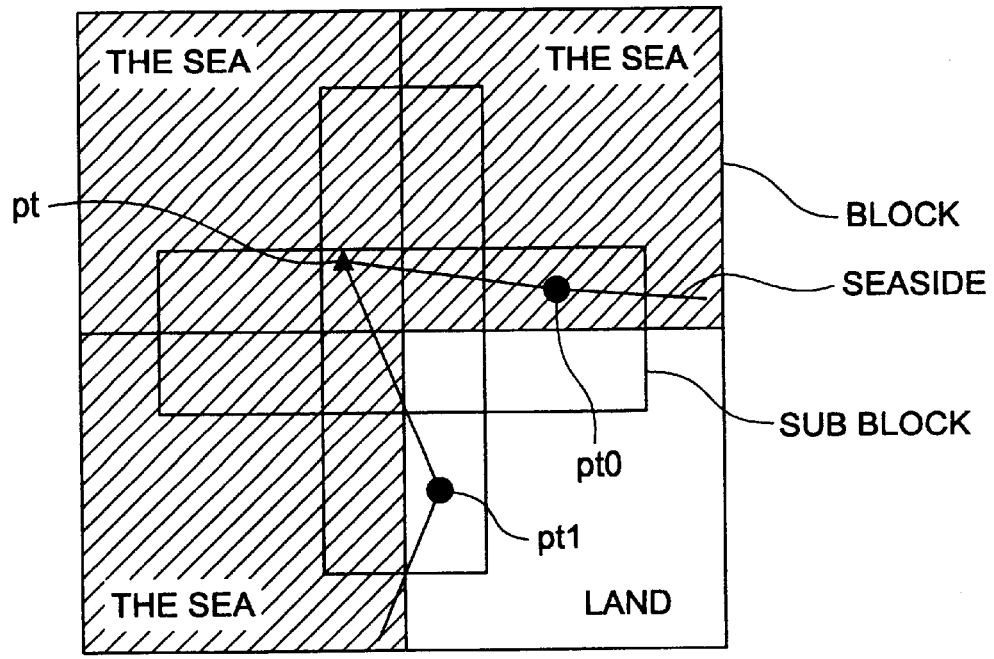
FIGS. 10A and 10B show diagrams representing patterns of extension process.

Description is made about the process with reference to FIGS. 10 and 11. As described about FIG. 5, projected portion such as a cape may be projected only within the predetermined sub block range. For example, in FIG. 10A, the top left seaside of the land block can be projected or worn in a range of a sub block which covers four blocks (the sub block belongs to [SEA_SAME]). This is because that the middle additional point pt is randomly located in the sub block.

Herein, to create more complex geographical features to express more natural seaside, the seaside is expanded so as not to connect the other land block. In this example, process about a sub block is illustrated, but process about a sub block is similar to the process about the sub block [SEA_SAME].

Figure 10B:
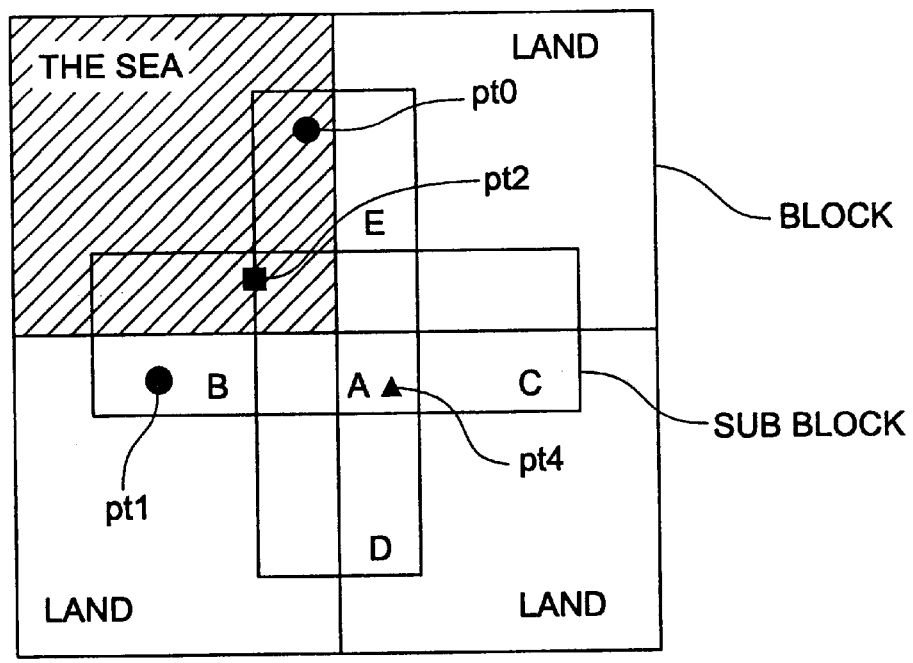
Figure 11A:
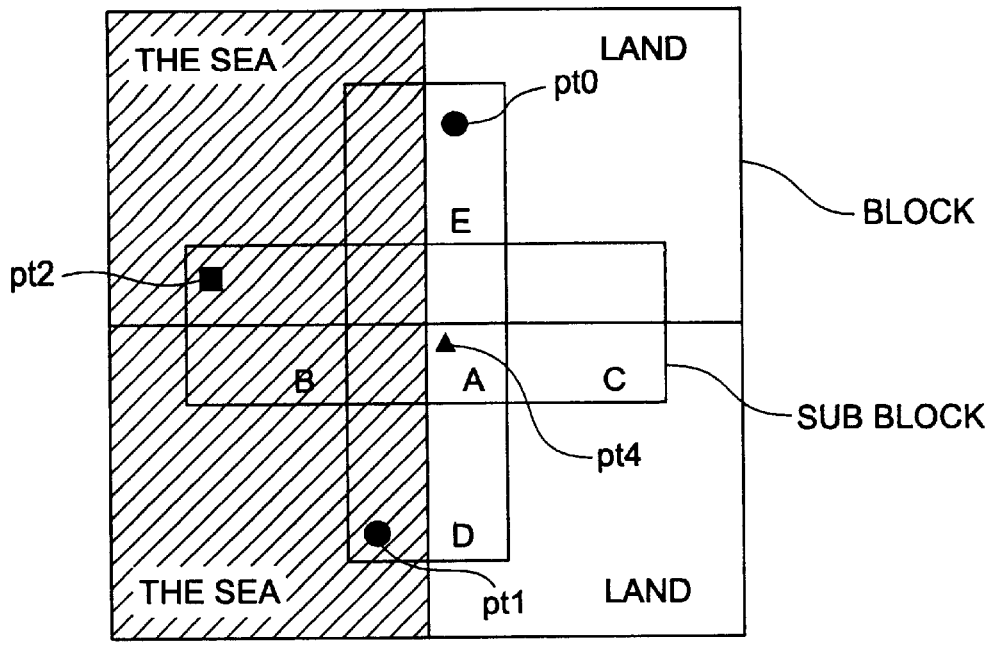
FIGS. 11A and 11B show diagrams representing other patterns of extension process.
Figure 11B:
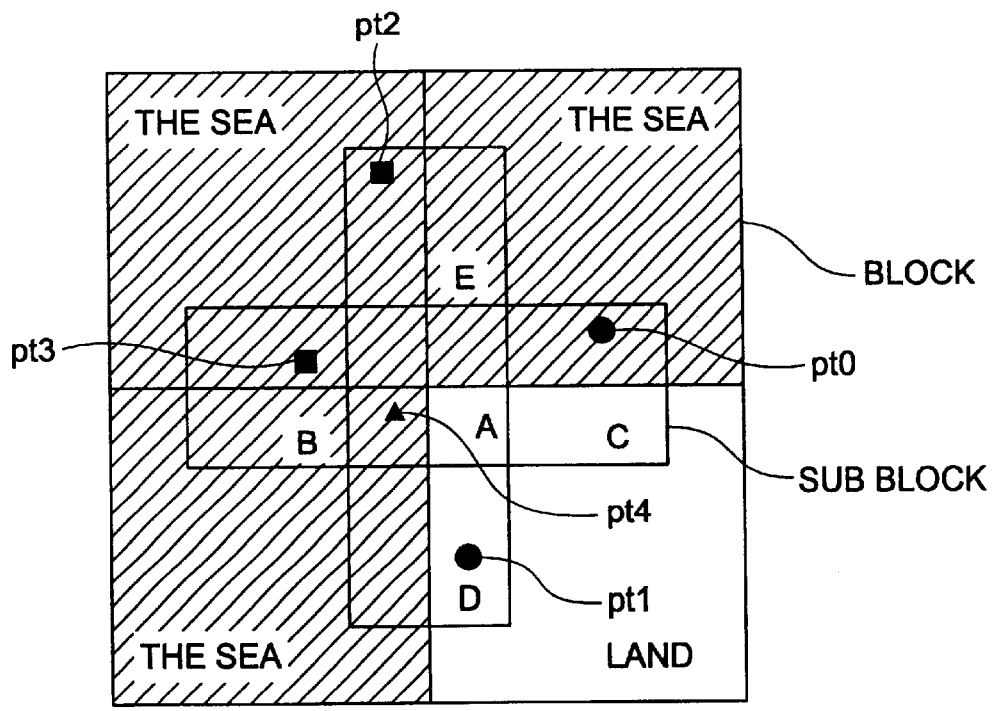

The sub block [SEA_SAME] is categorized into three patterns as shown in FIGS. 10B, 11A, and 11B, according to on the number of land blocks and the number of sea blocks.

In FIG. 10B, a sub block A which covers a sea block and two sub blocks E and B ([SEA_SIDE]) are shown. In FIG. 11A, a sub block A which covers two sea blocks, two sub blocks E and D ([SEA_SIDE]), and a sub block B ([SEA]) are shown. In FIG. 11B, a sub block A which covers three sea blocks, two sub blocks C and D ([SEA_SIDE]), and two sub blocks B and E ([SEA]) are shown.

In FIGS. 10B, 11A, and 11B, each of pt0 and pt1 represents the point "2" used in the first tranformation (denoted by "●"), and pt4 represents middle additional point used in the first transformation (denoted by "▲"). In the first transformation, pt4 is connected to pt0 and pt1 to create seaside. Also, pt4 is not used and pt0 and pt1 may be connected each other.

Herein, a new points pt2 is added to each example shown in FIGS. 10B, 11A, and 11B, and a new point pt3 is added to the example shown in FIG. 11B. In FIG. 10B, x-coordinates of the pt0, pt1, and pt4 are averaged and y-coordinates of the pt0, pt1, and pt4 are averaged, and the pt2 is added at the location having the averaged x-coordinate and the averaged y-coordinate. Therefore, if when x-coordinate and y-coordinate of a point ptn can be represented as (Xn, Yn) on the basis of an arbitrary point on the field map, coordinates of pt0, pt1, and pt4 can be represented as (x0, y0), (x1, y1), and (x4, y4), respectively. Further, coordinates of pt2 is represented as ((x0+x1+x4)/3,(y0+y1+y4)/3).

Herein, one of a triangle connecting points pt0, pt2, and pt4 and a triangle connecting points pt1, pt2, and pt4 is selected as land to expand a land portion. The both triangles may be selected. The selection of triangles may be performed using a random number. Therefore, if only the triangle which connects points pt0, pt2, and pt4 is selected, the seaside is formed along points pt0, pt2, pt4, and pt1. On the other hand, if only the triangle which connects points pt1, pt2, and pt4 is selected, the seaside is formed along points pt0, pt4, pt2, and pt1.

In FIG. 11A, a point pt2 is randomly located in a sub block B. Herein, one of a triangle connecting points pt0, pt2, and pt4 and a triangle connecting points pt1, pt2, and pt4 is selected as land to expand a land portion. The both triangles may be selected.

In FIG. 11B, each of points pt2 and pt3 is randomly located in a sub block B. Herein, one of a triangle connecting points pt0, pt2, and pt4 and a triangle connecting points pt1, pt3, and pt4 is selected as land to expand a land portion. The both triangles may be selected. Therefore, if only the triangle which connects points pt0, pt2, and pt4 is selected, the seaside is formed along points pt0, pt2, pt4, and pt1. On the other hand, if only the triangle which connects points pt1, pt3, and pt4 is selected, the seaside is formed along points pt0, pt4, pt3, and pt1. If the both triangles are selected, the seaside is formed along points pt0, pt2, pt4, pt3, and pt1.

The above mentioned expansion process can transform the seaside more complex to create more natural seaside by projecting the seaside toward the sea.

Wearing Process

The wearing process selects some land cells (cells belong to the land portion) contacting with a sea cell (cell belongs to the sea portion) among sub blocks [SEA_SAME], [SEA_DIFFER], [SEA_SIDE], and [B_SEA], creates line starting from one of the land cells in the land portion with random curve, and changes two cells wide land cells to sea cells along the created line. As described above, the cell means a quadrilateral which is obtained by dividing the whole field map into 128 by 128 in a lattice form. When the cell is assigned to the sea, the cell is referred to as "sea cell", when the cell is assigned to land, the cell is referred to as "land cell".

In this example, description is made about a sub block [SEA_SAME] with reference to FIG. 12, other blocks [SEA_DIFFER], [SEA_SIDE], and [B_SEA] may be processed in a similar manner.

Figure 12A:
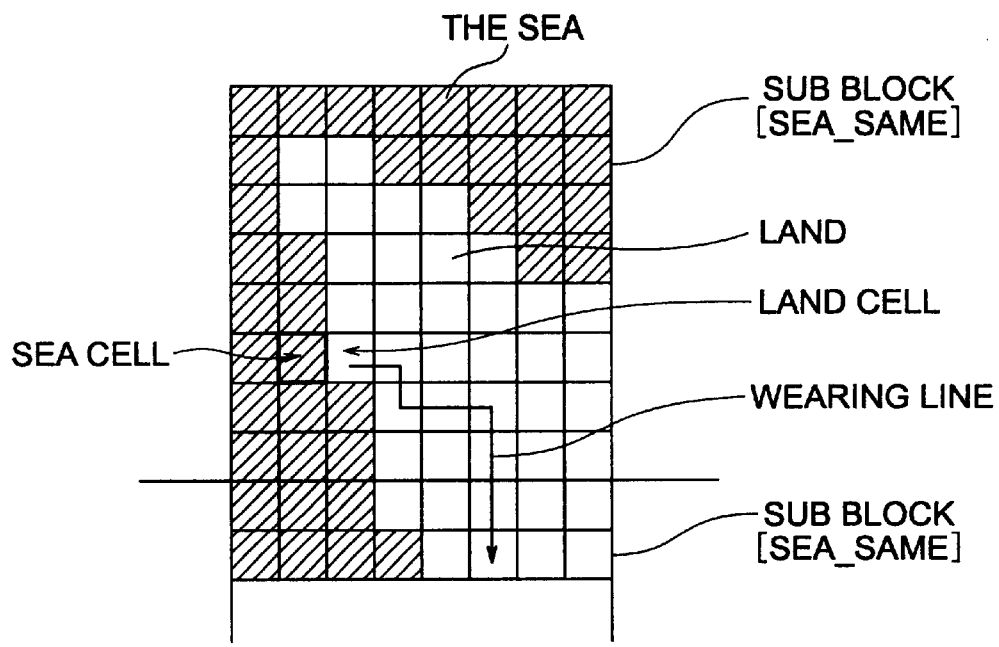
FIGS. 12A and 12B show diagrams representing procedure of wearing process.

In FIG. 12A, a sub block [SEA_SAME] and an adjacent block is shown. As described above, a sub block includes 8 by 8 cells. At first, a sea cell which contacts with a land cell is selected. Then, line is extended with randomly curving from a land cell contacting with the selected sea cell toward land. The extension of the line is performed by some extension operations. The direction and length of each extension operation are determined, for example, by a random number. After repeating the extension operations, a wearing line is created as shown in FIG. 12.

Figure 12B:
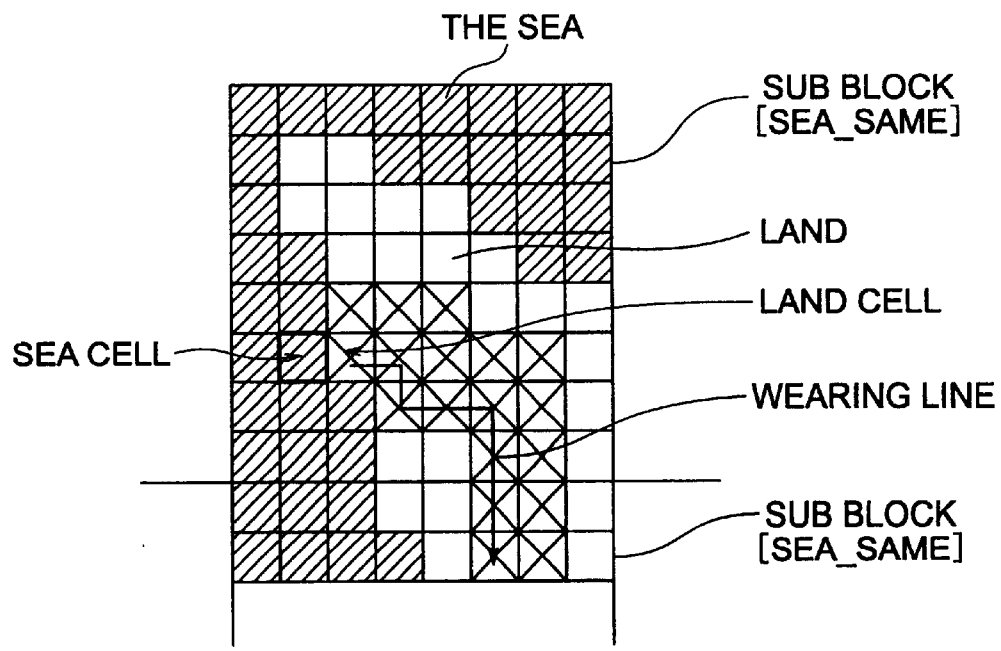

When the wearing line is created, cells are worn along the line with two cells width. That is, the worn cells (land cells)

are changed to sea cells. The operation is shown in FIG. 12B. Herein, cells which are changed to sea cells are denoted by x mark. Also, a way of treating of two cells width is decided as desired. For example, in FIG. 12B, wearing line cells which the wearing line passes through and upper, lower, right, and left adjacent cells of the wearing line cells are changed to sea cells. As shown in FIG. 12B, the wearing line can proceed beyond the boundary between the sub blocks, but can not stride the path between the points established at step S24. This is because that the path should be located on land, and for each cell, information whether or not the cell is assigned to the path is managed.

Also, it is possible to give a various limitation of location where the wearing line is expanded to (that is, length of the wearing line). The wearing process may be further repeated by selecting some starting land cells.

Figure 13:
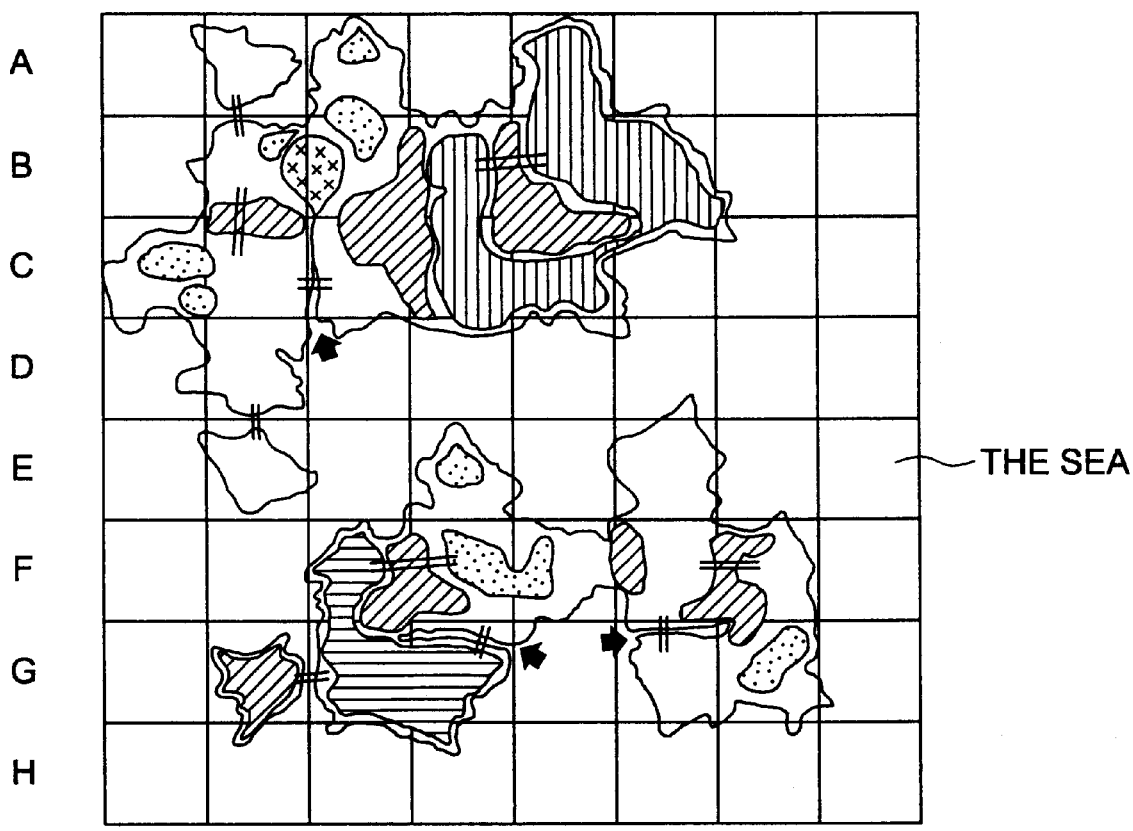
FIG. 13 shows an example of finally obtained field map.

In FIG. 13, field map processed by the processes mentioned above is shown. The boundary between a land portion and a sea portion, that is seaside, has various and complex undulations to form more natural geographical features comparing with the seaside shown in FIG. 6. Also, the seaside in FIG. 13 is drastically transformed far from the original quadrilateral blocks.

Returning to flowchart in FIG. 2, in step S28, land which is processed by the second transformation is decorated. The decoration process includes 3D process, scene arrange process, and object arrange process.

The 3D process adds 3D effect on the field map to express more natural and undulating land. The scene arrange process arranges a snowy field and a desert according to setting of each area. The object arrange process arranges objects and items required for the game on the field map.

These processes are previously or dynamically (with an advance of the game) performed. Furthermore, the scene arrange process arranges forest on a grassy field or a snowy field, and arranges a craggy mountain on a desert. The size and location of the forest and the craggy mountain may be determined on the basis of a random number. In this example, since it is necessary that the areas are conceptually separated each other because of configuration of the game, geographical items which prevents a character from pass through, such as a mountain, a river, and a lake, are located at the boundaries between areas.

Furthermore, since it should be possible to move all the blocks in an area, for example when a sub block is isolated by the sea or a river, a bridge should be located, or when a sub block is separated by a mountain, a tunnel is created in the mountain. Also, the bridge and the tunnel are created so as to connects two points "2".

Example of field map which is obtained by performing these processes is shown in FIG. 13. A shape of land portions is drastically changed, but each of the portions still corresponds to one of the sub area shown in FIG. 3. Therefore, description is made about each part of the field map using the names of the sub areas.

In the example shown in FIG. 13, since sub areas b0 and a0 are assigned to showy field and sub areas c0 and c2 are assigned to desert, snowy field (shown in FIG. 13 as a field shadowed by vertical lines) is shown in the sub areas b0 and a0, and desert (shown in FIG. 13 as a field shadowed by horizontal lines) is shown in the sub areas c0 and c2.

Mountains (shown in FIG. 13 as fields shadowed by slanted lines) are located at boundaries between the sub areas b1 and b0, b0 and a0, a0 and a1, c0 and c1, c1 and d0, and d0 and d1. And if the above two sub areas belong to the same area, a tunnel (shown in FIG. 13 as a symbol denoted by two short lines crossing the mountain) is located to pass through the mountain.

Rivers (the mouths of the rivers are denoted by arrows in FIG. 13) are located at boundaries between the sub areas a0 and a1, c0 and c1, and d0 and d1. Since the pairs of the sub areas belong to the same area, bridges (shown in FIG. 13 as symbols denoted by two short lines crossing the rivers) are built so that the game character may passes through the rivers.

Three pairs of sub areas a2 and a0, a1 and a3, and c2 and c0 are each separated by the sea, since one of the pair is island. But, since the pairs are each belong to the same area, bridges (shown in FIG. 13 as symbols denoted by two short lines crossing the sea) are built so that the game character may passes through the sea.

The remaining portions of land are grassy field, and forests (shown in FIG. 13 as fields filled by a plurality of dots) are located in some parts of the grassy field. Also, craggy mountains (not shown in FIG. 13) are randomly located in desert portions. Furthermore, a lake (shown in FIG. 13 as a field filled by a plurality of x marks) is located in the sub area a0.

In the real game, thus generated field map is displayed as a bird's-eye view, or partly enlarged and displayed in a three-dimensional way as a stage of the game using information of the field map.

Explanation has been made about the illustrative field map, but it is obvious that the transformation process of the invention can be applied to a various field maps. Further, detail settings of the invention are not limited to the above example, and may be optionally selected. The settings include, for example, the number of blocks, the number of cells, the number of areas, assigning of a sub area, and an arranging way of a snowy field.

According to the invention, a method is provided which automatically changes information of a field map expressing a dungeon to represent the dungeon in more natural aspect and with more complex geographical features.

What is claimed is:

1. A method of generating a field map used in a video game, comprising the steps of:

dividing the field map which consists of a plurality of blocks, into a first zone and a second zone by a boundary including sides and corners of the blocks;

determining a first point for each side of the boundary on the basis of a location of each side of the boundary;

determining a second point for each corner of the boundary on the basis of a location of each corner of the boundary; and transforming the boundary by connecting the first points and the second points.

2. A method of generating a field map used in a video game, comprising the steps of:

dividing the field map into a plurality of quadrilateral blocks;

assigning each of the divided blocks to either a first zone or a second zone;

selecting sides, each of which forms a part of a boundary between the first zone and the second zone, from sides of the blocks;

selecting a point which corresponds to a corner of one of the blocks and which is included in the boundary;

determining a first point for each selected side on the basis of a location of each side of the boundary;

determining a second point for each selected point on the basis of a location of each corner of the boundary; and transforming the boundary by connecting the first points and the second points.

3. The method of claim 2 further comprising the steps of:
selecting two first points, each of which corresponds to a side, the two corresponding sides are adjacent to each other;
selecting one second point which corresponds to a corner formed by the two corresponding side;
determining a third point by moving the selected second point on the basis of an aspect of the assigning of the divided blocks to the first zone or the second zone; and
transforming the boundary by connecting the two selected first points and a point which is optionally selected from the selected second point and the determined third point.

4. The method of claim 3, wherein each block in the first zone belongs to an area, the determination of the third point is performed based on, considering blocks including two columns and two rows, either of (a) the number of the blocks which belong to the first zone, (b) whether the blocks which belong to the first zone belong to different areas or not, and (c) location relationship, when there is at least one block which belongs to the second zone, between the blocks which belong to the first zone and the at least one block which belongs to the second zone.

5. A method of generating a field map used in a video game, comprising the steps of:
dividing the field map into a plurality of quadrilateral cells;
assigning each of the divided cells to either a first zone or a second zone;
determining a first cell which belongs to the first zone and is next to a cell which belongs to the second zone;
selecting a cell which belongs to the first zone and is next to the first cell, and further repeatedly selecting a cell which belongs to the first zone and is next to the selected cell; and
transforming a boundary between the first zone and the second zone by changing cells having a predetermined location relationship to the selected cells to cells which belong to the second zone.

6. The method of claim 5, wherein the cells having the predetermined location relationship include the selected cells, first additional cells located on the same column as the selected cells and on a upper row nearest to the selected cells, second additional cells located on a right column nearest to the selected cells, and third additional cells located on the upper row nearest to the second additional cells.

7. The method of claim 5, wherein the selecting step randomly selects, as adjacent cell, one of cells located on the upper row, the lower row, the right column, and the left column, all of which are nearest to a previous cell, and repeats the random selection predetermined times.

8. A method of generating a field map used in a video game, comprising the steps of:
dividing the field map into a plurality of quadrilateral blocks including a plurality of quadrilateral cells;
assigning each of the divided blocks to either a first zone or a second zone;
selecting sides, each of which forms a part of a boundary between the first zone and the second zone, from sides of the blocks;
selecting a point which corresponds to a corner of one of the blocks and which is included in the boundary;
determining a first point for each selected side on the basis of a location of each side of the boundary;
determining a second point for each selected point on the basis of a location of each corner of the boundary;
selecting two first points, each of which corresponds to a side, the two corresponding sides are adjacent to each other;
selecting one second point which corresponds to a corner formed by the two corresponding side;
determining a third point by moving the selected second point on the basis of an aspect of the assigning of the divided blocks to the first zone or the second zone;
transforming the boundary by connecting the two selected first points and a point which is optionally selected from the selected second point and the determined third point;
selecting a first cell which belongs to the first zone and is next to a cell which belongs to the second zone;
selecting a cell which belongs to the first zone and is next to the first cell, further selecting a cell which belongs to the first zone and is next to the selected cell, and repeating the selection of a cell; and
transforming the transformed boundary by changing cells having a predetermined location relationship to the selected cells to cells which belong to the second zone.

9. A video game system which generates a field map comprising:
block division means which divides the field map into a plurality of quadrilateral blocks;
block assign means which assigns each of the divided blocks to either a first zone or a second zone;
side select means which selects sides each of which forms a part of a boundary between the first zone and the second zone, from sides of the blocks;
corner select means which selects a point which corresponds to a corner of one of the blocks and which is included in the boundary;
first point determining means which determines a first point for each selected side on the basis of a location of each side of the boundary;
second point determining means which determines a second point for each selected point on the basis of a location of each corner of the boundary; and
first transforming means which transforms the boundary by connecting the first points and the second points.

10. The system of claim 9 further comprising:
first point selecting means which selects two first points each of which corresponds to a side, the two corresponding sides are adjacent to each other;
second point selecting means which selects one second point which corresponds to a corner formed by the two corresponding sides;
third point determining means which determines a third point by moving the selected second point on the basis of an aspect of the assigning of the divided blocks to the first zone or the second zone by the block assign means; and second transforming means which transforms the boundary by connecting the two selected first points and a point which is optionally selected from the selected second point and the determined third point.

11. A video game system which generates a field map comprising:
cell dividing means which divides the field map into a plurality of quadrilateral cells;
cell assign means which assigns each of the divided cells to either a first zone or a second zone;
first cell selecting means which selects a first cell which belongs to the first zone and is next to a cell which belongs to the second zone;

second cell selecting means which selects a cell which belongs to the first zone and is next to the first cell, further selecting a cell which belongs to the first zone and is next to the selected cell, and repeating the selection of a cell; and transforming means which transforms a boundary between the first zone and the second zone by changing cells having a predetermined location relationship to the selected cells to cells which belong to the second zone.

12. A video game system which generates a field map comprising:

block division means which divides the field map into a plurality of quadrilateral blocks including a plurality of quadrilateral cells;

block assign means which assigns each of the divided blocks to either a first zone or a second zone;

side select means which selects sides each of which forms a part of a boundary between the first zone and the second zone, from sides of the blocks;

corner select means which selects a point which corresponds to a corner of one of the blocks and which is included in the boundary;

first point determining means which determines a first point for each selected side on the basis of a location of each side of the boundary;

second point determining means which determines a second point for each selected point on the basis of a location of each corner of the boundary;

first point selecting means which selects two first points each of which corresponds to a side, the two corresponding sides are adjacent to each other;

second point selecting means which selects one second point which corresponds to a corner formed by the two corresponding sides third point determining means which determines a third point by moving the selected second point on the basis of an aspect of the assigning of the divided blocks to the first zone or the second zone by the block assign means;

first transforming means which transforms the boundary by connecting the two selected first points and a point which is optionally selected from the selected second point and the determined third point;

first cell selecting means which selects a first cell which belongs to the first zone and is next to a cell which belongs to the second zone;

second cell selecting means which selects a cell which belongs to the first zone and is next to the first cell, further selecting a cell which belongs to the first zone and is next to the selected cell, and repeating the selection of a cell; and second transforming means which transforms the transformed boundary by changing cells having a predetermined location relationship to the selected cells to cells which belong to the second zone.

13. A recording medium readable by a computer, tangibly embodying a program of generating a field map used in a video game, comprising the steps of:

dividing the field map into a plurality of quadrilateral blocks;

assigning each of the divided blocks to either a first zone or a second zone;

selecting sides each of which forms a part of a boundary between the first zone and the second zone, from sides of the blocks;

selecting a point which corresponds to a corner of one of the blocks and which is included in the boundary;

determining a first point for each selected side on the basis of a location of each side of the boundary;

determining a second point for each selected point on the basis of a location of each corner of the boundary; and transforming the boundary by connecting the first points and the second points.

14. A recording medium readable by a computer, tangibly embodying a program of generating a field map used in a video game, comprising the steps of:

dividing the field map into a plurality of quadrilateral cells;

assigning each of the divided cells to either a first zone or a second zone;

selecting a first cell which belongs to the first zone and is next to a cell which belongs to the second zone;

selecting a cell which belongs to the first zone and is next to the first cell, further selecting a cell which belongs to the first zone and is next to the selected cell, and repeating the selection of a cell; and transforming a boundary between the first zone and the second zone by changing cells having a predetermined location relationship to the selected cells to cells which belong to the second zone.

15. A recording medium readable by a computer, tangibly embodying a program of generating a field map used in a video game, comprising the steps of:

dividing the field map into a plurality of quadrilateral blocks including a plurality of quadrilateral cells;

assigning each of the divided blocks to either a first zone or a second zone;

selecting sides, each of which forms a part of a boundary between the first zone and the second zone, from sides of the blocks;

selecting a point which corresponds to a corner of one of the blocks and which is included in the boundary;

determining a first point for each selected side on the basis of a location of each side of the boundary;

determining a second point for each selected point on the basis of a location of each corner of the boundary;

selecting two first points each of which corresponds to a side, the two corresponding sides are adjacent to each other;

selecting one second point which corresponds to a corner formed by the two corresponding sides;

determining a third point by moving the selected second point on the basis of an aspect of the assigning of the divided blocks to the first zone or the second zone;

transforming the boundary by connecting the two selected first points and a point which is optionally selected from the selected second point and the determined third point;

selecting a first cell which belongs to the first zone and is next to a cell which belongs to the second zone;

selecting a cell which belongs to the first zone and is next to the first cell, further selecting a cell which belongs to the first zone and is next to the selected cell, and repeating the selection of a cell; and transforming the transformed boundary by changing cells having a predetermined location relationship to the selected cells to cells which belong to the second zone.

* * * * *